United States Patent
Katayama et al.

(10) Patent No.: US 6,745,616 B1
(45) Date of Patent: Jun. 8, 2004

(54) SURFACE TEXTURE MEASURING MACHINE, LEVELING DEVICE FOR SURFACE TEXTURE MEASURING MACHINE AND ORIENTATION-ADJUSTING METHOD OF WORKPIECE OF SURFACE TEXTURE MEASURING MACHINE

(75) Inventors: Minoru Katayama, Kure (JP); Hideki Mishima, Miyazaki (JP); Toshihiro Kanematsu, Miyazaki (JP); Hiroomi Honda, Miyazaki (JP); Hiroyuki Hidaka, Miyazaki (JP); Kazushige Ishibashi, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/690,590

(22) Filed: Oct. 18, 2000

(30) Foreign Application Priority Data

Oct. 21, 1999 (JP) .......................... 11-299508

(51) Int. Cl.⁷ .................. B23Q 17/09; G01N 19/02; G01B 3/14; G01B 5/20
(52) U.S. Cl. ................ 73/104; 33/551; 33/554; 33/555
(58) Field of Search ............ 73/104, 105; 33/549, 33/551, 553, 554, 555

(56) References Cited

U.S. PATENT DOCUMENTS

| | | | | |
|---|---|---|---|---|
| 1,823,719 A | * | 9/1931 | Baker | 33/555 |
| 3,286,353 A | * | 11/1966 | Potter | 33/549 |
| 3,499,227 A | * | 3/1970 | Krause et al. | 33/554 |
| 5,253,429 A | * | 10/1993 | Konno et al. | 33/1 M |
| 5,408,750 A | * | 4/1995 | Teng et al. | 33/1 M |
| 6,154,713 A | * | 11/2000 | Peter et al. | 702/95 |

FOREIGN PATENT DOCUMENTS

| | | | | |
|---|---|---|---|---|
| JP | 57028206 A | * | 2/1982 | 33/546 |
| JP | A 1-272902 | | 10/1989 | |
| JP | A 06-011337 | | 1/1994 | |
| JP | 8-29153 | | 2/1996 | |
| JP | A 08-086631 | | 4/1996 | |
| JP | 8-122055 | | 5/1996 | |
| WO | WO-90-12277 | * | 10/1990 | 33/551 |

OTHER PUBLICATIONS

Merriam–Webster's Collegiate Dictionary, 10th ed., 1998, p. 684.*
English translation of JP–08–029153 (Fukuda et al.) provided by JPO website (http://www.4.ipdl.jpo.go.jp) on Apr. 12, 2002.*
English translation of JP–08–122055 provided by JPO website (http://www.4.ipdl.jpo.go.jp) on Apr.12, 2002.*

* cited by examiner

Primary Examiner—Michael Cygan
(74) Attorney, Agent, or Firm—Oliff & Berridge, PLC

(57) ABSTRACT

In advance to measuring texture of the workpiece by a surface texture measuring machine (1), a workpiece orientation adjustment stage (10) is manually moved by the surface texture measuring machine (1) in accordance with calculated orientation correction amount of the workpiece, thus adjusting orientation of the workpiece. Since it is only necessary for an operator to operate respective adjustment means until reaching a displayed correction amount, operation thereof can be facilitated and orientation thereof can be highly accurately adjusted without impairing operability.

4 Claims, 12 Drawing Sheets

F I G. 1
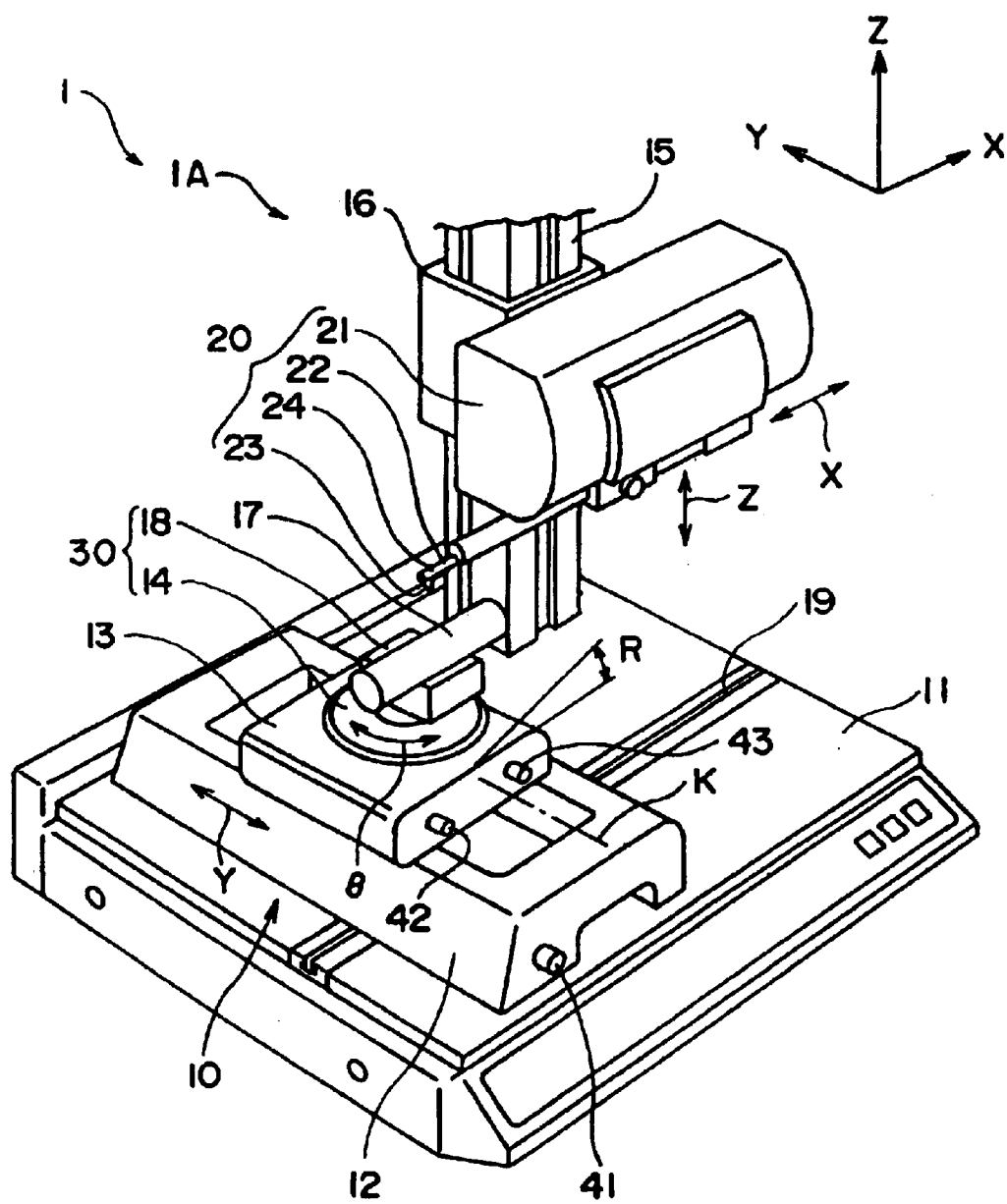

F I G. 11
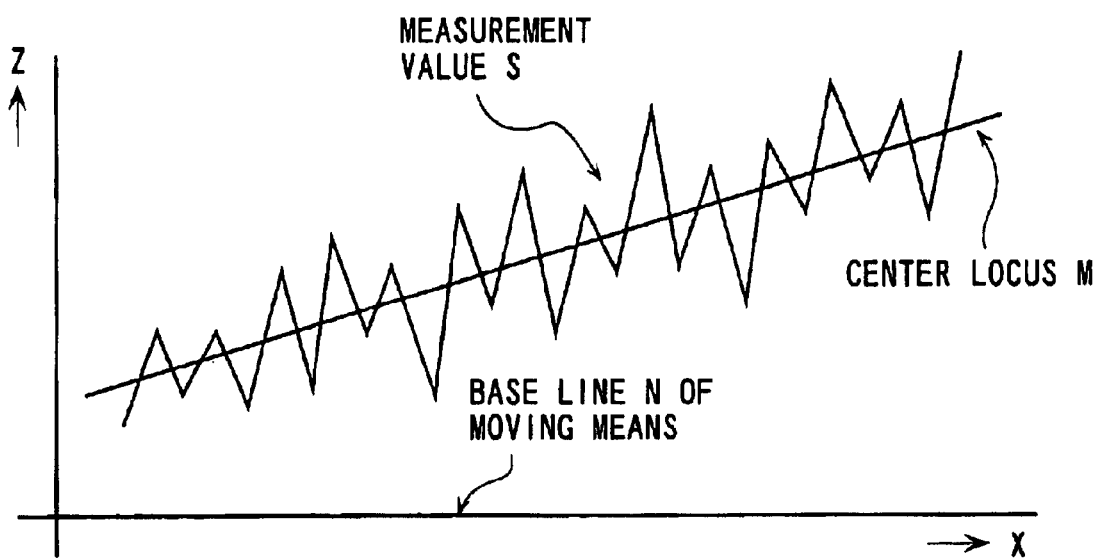
F I G. 12
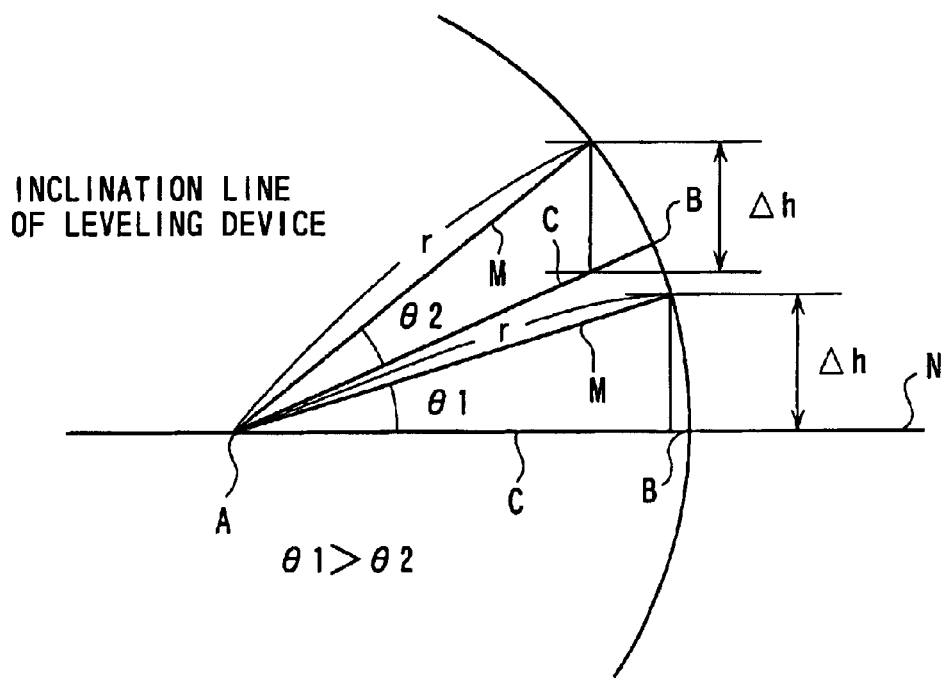

F I G. 13(A)
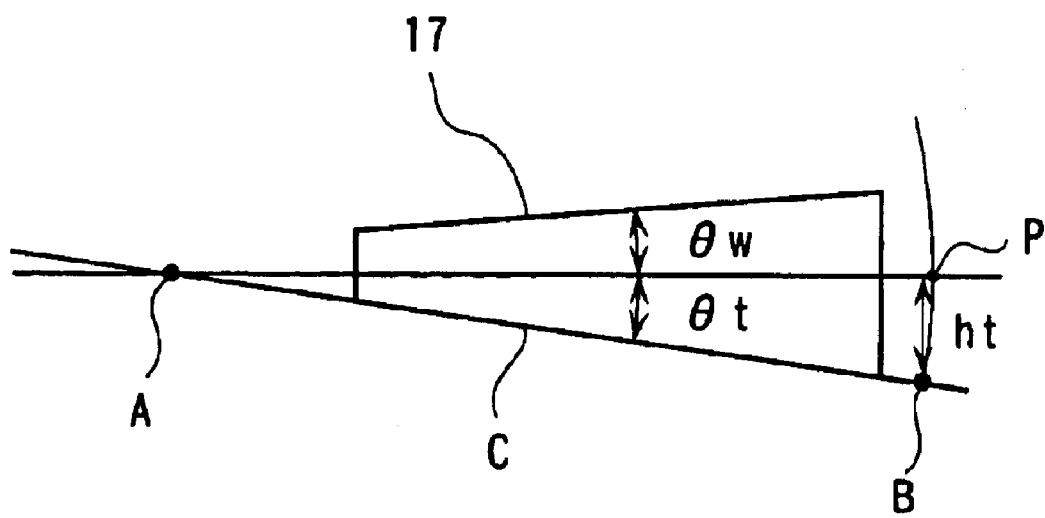
F I G. 13(B)
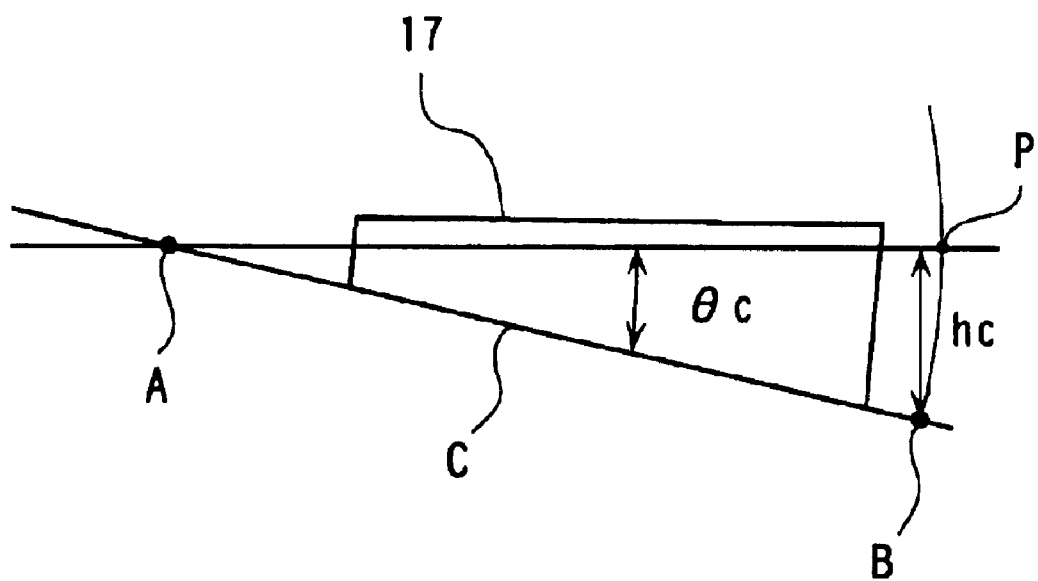

SURFACE TEXTURE MEASURING MACHINE, LEVELING DEVICE FOR SURFACE TEXTURE MEASURING MACHINE AND ORIENTATION-ADJUSTING METHOD OF WORKPIECE OF SURFACE TEXTURE MEASURING MACHINE

BACKGROUND OF THE INVENTION

1. Field of the Invention

The present invention relates to a surface texture measuring machine for measuring surface roughness, waviness, profile etc., an leveling device for the surface texture measuring machine and an orientation-adjusting method of a workpiece disposed on the surface texture measuring machine, which is specifically used for correcting relative inclination between the workpiece and measurement direction of a sensor before actual measurement, the workpiece being convex or concave and having edge line such as cylindrical shape and conic shape.

2. Description of Related Art

Conventionally, a form measuring instrument for measuring surface roughness or profile of a workpiece having cylindrical shape, conic shape etc. is known. FIGS. 17 and 18 show example workpieces of the related art (Japanese Patent Laid-Open Publication No. Hei 8-29153 to Fukuda).

The form measuring instrument has a drive means for driving a workpiece relative to a sensor, where an orientation of the workpiece rested on a stage is automatically corrected to a reference orientation (orientation in conducting actual measurement) in advance to the actual measurement, thus defining a position to center or level the workpiece.

However, the above-described form-measuring instrument requires a drive sources such as a motor for moving the stage in X-axis direction (measurement direction), Y-axis direction.(a direction orthogonal with the measurement direction on a horizontal plane) and Z-axis direction (a direction orthogonal with the measurement direction in a perpendicular plane). As a result, a space for attaching a plurality of motors is required, thus complicating the structure of the device, so that the size of the measuring machine is increased.

Further, since the measuring machine requires the plurality of motor, vibrations from respective motors can be overlapped to generate great vibration, thus impairing highly accurate measurement. For preventing the vibration, rigidity of base such as the stage has to be increased, thus further increasing the size of the device. Moreover, since the device requires the plurality of motor, the device can be expensive.

SUMMARY OF THE INVENTION

An object of the present invention is to provide a surface texture measuring machine, an leveling device for the surface texture measuring machine and an orientation-adjusting method of workpiece of the surface texture measuring machine, where the orientation of the workpiece can be easily adjusted without impairing operability, the size and cost of the device can be reduced and highly accurate measurement is possible.

In the present invention, the above object is achieved by manually moving a workpiece orientation adjustment stage in accordance with a calculated orientation correction amount of the workpiece to adjust the orientation of the workpiece, thus accurately scanning the texture of the workpiece by the surface texture measuring machine.

More specifically, a surface texture measuring machine according to the present invention is for measuring a surface texture of a workpiece held on a workpiece orientation adjustment stage, the workpiece having an edge line and being movable in a measurement direction (X-axis direction) and in a direction (Y-axis direction) orthogonal with the X-axis direction within a horizontal plane and rotatable in a X-Y plane, the workpiece being capable of seesawing in a direction (Z-axis direction) orthogonal with the X-axis direction within a perpendicular plane, the surface texture of the workpiece being scanned by a sensor movable in the X-axis direction after adjusting orientation of the workpiece, the surface texture measuring machine is characterized in having: a measurement controller for adjusting the orientation of the workpiece; and a measurement means being controlled by the measurement controller, the measurement controller comprising: a surface texture measurement controller for measuring the surface texture of the workpiece; a X-axis coordinates input means for inputting X-axis coordinates at a measurement start point and a measurement end point in adjusting the orientation of the workpiece; a Y-axis coordinates input means for inputting Y-axis coordinates at a measurement start point and a measurement end point in adjusting the orientation of the workpiece; a swivel correction angle calculation means for calculating a swivel inclination angle (an inclination angle within the X-Y plane relative to X-axis) and a swivel correction angle from the X-axis coordinates inputted by the X-axis coordinates input means and the Y-axis coordinates inputted by the Y-axis coordinate input means; and a swivel correction angle display for displaying the swivel correction angle calculated by the swivel correction angle calculation means, the measurement means comprising: a Y-axis adjustment means for adjusting orientation of the workpiece by manually displacing the workpiece in the Y-axis direction in accordance with the swivel correction angle displayed on the swivel correction angle display; and a swivel adjustment means for manually rotating the workpiece within the X-Y plane to adjust orientation thereof.

The workpiece having edge line includes workpiece having hog-backed shape, square-pillar shape such as triangular pillar and pentagonal pillar and pyramidal shape such as triangular pyramid and pentagonal pyramid as well as cylindrical shape (solid or hollow) and conic shape.

Further, as long as the workpiece is put on the workpiece orientation adjustment stage so that edge line thereof can be seen, other workpiece having square pillar shape such as rectangular pillar and hexagonal pillar, pyramidal shape such as square pyramid and hexagonal pyramid may be measured.

Further, the edge line may be curved (for instance, when the workpiece is curved cylindrical shape) and the edge line does not necessarily continue all the length over the workpiece as long as a certain amount of length is continued.

Further, adjustment of orientation refers to align the workpiece to a reference orientation in conducting the actual measurement, which is not restricted to one orientation per one workpiece but may be a plurality of orientation. For instance, when the workpiece is cylindrical, there can be a reference orientation adapted for measuring roughness and profile along axial direction of the cylinder and another reference orientation adapted for measuring roughness and profile along radial direction of the cylinder (a direction orthogonal with the axis thereof).

Further, as the stage means, a stage for the workpiece to be rested thereon, a V-block, a vice and a clip or a combination thereof can be used.

As the Y-axis adjustment means and the swivel adjustment means, micrometer head etc. with the correction amount being digitally displayed and having a knob thereon may preferably be used so that the workpiece can be manually moved in Y-axis direction and can be manually rotated on the X-Y thus adjusting with high accuracy. However, other arrangement is possible as long as the same effect can be obtained.

According to the present invention, the workpiece having the edge line is put on the workpiece orientation adjustment stage and the workpiece orientation adjustment stage and the sensor is relatively displaced to adjust the orientation of the workpiece into the reference orientation (an orientation during actual measurement). Subsequently, surface texture of the workpiece at the reference orientation is measured.

At this time, in order to adjust the orientation of the workpiece, the orientation of the workpiece is preliminarily measured at two points on the workpiece put on the workpiece orientation adjustment stage along measurement direction. Base on the measurement result of the preliminary measurement, an error of the orientation of the workpiece relative to the reference orientation is calculated by the swivel correction calculation means, and the operator manually operates the Y-axis adjustment means and the swivel adjustment means to correct the orientation of the workpiece into a reference orientation based on the value displayed on the swivel correction amount display.

Accordingly, in adjusting the orientation, the operator can adjust the orientation of the workpiece on the X-Y plane by operating the Y-axis adjustment means and the swivel adjustment means according to the correction amount calculated from the measurement start point and the measurement end point of the workpiece put on the workpiece orientation adjustment stage. Since it is necessary for the operator only to operate the respective adjustment means until the displayed correction amount is reached, operation can be facilitated and the orientation of the workpiece can be conducted with high accuracy without impairing operability.

Further, the respective adjustment means can be manually operated, drive means such as motor is not required. Accordingly, a space for attaching the motor is not necessary, thus simplifying the structure of the device and reducing the size and cost thereof.

In the surface texture measuring machine according to the present invention, the measurement controller may preferably further include: a Z-axis coordinates input means for inputting Z-axis coordinates of the workpiece at the measurement start point and the measurement end point in adjusting orientation of the workpiece; an inclination correction calculation means for calculating an inclination amount within a X-Z plane and an inclination correction amount from the X-axis coordinates and the Z-axis coordinates inputted by the Z-axis coordinates input means; and an inclination correction display for displaying inclination correction amount calculated by the inclination correction calculation means, and the measurement means may preferably further include an inclination adjustment means for manually displacing the workpiece in Z-axis direction in accordance with the inclination correction amount calculated by the inclination correction calculation means for adjusting orientation thereof.

The above Z-axis adjustment means may preferably be a micrometer head etc. with the correction amount being digitally displayed thereon and having a knob for facilitating manually moving the workpiece in Z-axis direction and enabling adjustment with high accuracy. However, other arrangement is possible as long as the same effect can be obtained.

According to the present invention, since the movement of the workpiece in Z-axis direction, i.e. inclination can be adjusted, the orientation within the X-Z plane can be adjusted with higher accuracy, thus enabling highly accurate actual measurement.

In the surface texture measuring machine, the Y-axis adjustment means, the swivel adjustment means and the inclination adjustment means respectively may preferably include a micrometer head.

The micrometer head may preferably include a display for digitally displaying the correction amount.

According to the present invention, since the orientation can be adjusted by operating the micrometer head, the orientation can be adjusted with high accuracy without impairing operability.

An orientation adjusting method of a workpiece according to the present invention uses a surface texture measuring machine, the workpiece having an edge line and being movable in a measurement direction (X-axis direction) and in a direction (Y-axis direction) orthogonal with the X-axis direction within a horizontal plane and rotatable in a X-Y plane, the workpiece being capable of seesawing in a direction (Z-axis direction) orthogonal with the X-axis direction within a perpendicular plane, the surface texture of the workpiece being scanned by a sensor movable in the X-axis direction after adjusting orientation of the workpiece. The orientation adjusting method is characterized by having the steps of: measuring positions of the workpiece relative to the sensor at a measuring start point and a measurement end point; calculating orientation of the workpiece from the positions to obtain an orientation correction angle; displaying or printing the orientation correction angle; and operating an adjustment means of the workpiece orientation adjustment stage to correct the orientation of the workpiece.

According to the present invention, the orientation of the workpiece can be adjusted by operating the Y-axis adjustment means and the swivel adjustment means in accordance with the correction amount calculated by the measurement start point and measurement end point of the workpiece put on the workpiece orientation adjustment stage. Since it is only necessary for the operator to operate the respective adjustment means until the displayed correction amount is reached, operation thereof can be facilitated and the orientation of the workpiece can be highly accurately adjusted without impairing operability.

Further, since the respective adjustment means can be manually operated, drive means such as motor is not required. Accordingly, a space for attaching the motor is not required, thus simplifying structure thereof and reducing size and the cost thereof.

In the orientation-adjusting method, the position of the workpiece at the measurement start point and the position of the workpiece at the measurement end point may preferably be detected as a maximum value or a minimum value of Z-axis coordinates within Y-Z plane.

According to the above arrangement, since the present invention can be applied to a workpiece having concave surface such as inner surface of a cylinder as well as outer surface of the cylinder, thus enlarging applicability of the present invention.

In the orientation-adjusting method according to the present invention, the orientation of the workpiece may preferably be conducted by rotating the workpiece on the X-Y plane relative to the sensor.

According to the present invention, since the orientation is adjusted based on the rotation within the X-Y plane, the workpiece can be aligned with the reference measurement direction only by a small angle of movement, so that the orientation can be adjusted immediately.

In the orientation-adjusting method according to the present invention, the orientation of the workpiece may preferably be adjusted by seesawing the workpiece on the X-Z plane relative to the sensor.

According to the present invention, since the orientation of the workpiece can be adjusted by seesawing the workpiece within X-Z plane, the workpiece can be aligned to a reference plane only by a small angle of tilting, thus enabling immediate orientation adjustment.

An leveling device according to the present invention is for a surface texture measuring machine having: a displacement detecting means movable in a measurement direction (X-axis direction) for measuring displacement on a surface of a workpiece; and a moving means for moving the displacement detecting means in the measurement direction to scan a displacement signal from the displacement detecting means, the surface texture measuring machine adjusting an amount of the workpiece relative to a base line as a movement locus of the displacement detecting means. The leveling device is characterized in having: a fulcrum during measurement and adjustment and a point of action working relative to the fulcrum; a manipulated valuable calculation means for scanning the surface of the workpiece by the displacement detecting means and for calculating a center locus of measurement data based on a displacement signal from the displacement detecting means to calculate a operation amount at the point of action relative to the fulcrum required for paralleling the center locus with the base line of the moving means; an output means for displaying, printing or outputting as data the operation amount; and an inclination adjustment means for manually adjusting inclination of a predetermined amount.

The above displacement detecting means may have any one of a contact type or a non-contact type displacement sensor as long as the sensor can measure the displacement (height) on the surface of the workpiece and can output a signal. Further, the inclination adjustment may preferably be a micrometer head including absolute micrometer head for manual accurate adjustment. However, other arrangement is possible as long as the same effect can be obtained by manual operation.

According to the present invention, the center locus of the measurement data obtained by scanning the surface of the workpiece is calculated by the operation amount calculation means. The inclination of the center locus is adjusted by the inclination adjustment means in accordance with the operation amount outputted by the output means to be parallel with the base line of the moving means. Accordingly, since the center locus of the measurement data is moved relative to the base line of the moving means to be parallel with each other and the inclination adjustment amount is given as an absolute quantity, so-called cosine error can be prevented to eliminate the inclination adjustment error, so that the orientation of the workpiece can be adjusted easily without impairing operability. Further, since the inclination can be manually adjusted without using a motor, the size and cost of the device can be reduced.

In the leveling device according to the present invention, the operation amount may preferably be calculated from an inclination reference position where an inclination line connecting the fulcrum and the point of action of the inclination adjustment means is parallel with the base line of the moving means.

According to the present invention, since the operation is conducted relative to the inclination adjustment reference position, so-called cosine error is unlikely to be caused and the inclination can be adjusted with one operation, thus facilitating the operation.

In the leveling device according to the present invention, the inclination adjustment means may preferably include a micrometer head.

The micrometer head constituting the inclination adjustment means includes an absolute micrometer head.

According to the present invention, the cost of the adjustment mechanism can be lowered, and when the absolute micrometer head is specifically used, the inclination can be accurately adjusted with small number of inclination adjustment operation.

In the leveling device according to the present invention, the operation amount includes operation amount at any two points on the inclination adjustment means conducting three-point support.

According to the present invention, since the inclination adjustment means can be independently operated at the two points, the inclination can be adjusted not only in X-axis direction but also in Y-axis (an axis orthogonal with X-axis direction on a horizontal plane) direction. Accordingly, the surface of the workpiece can be three-dimensionally measured, thus enlarging measurement range.

In the leveling device according to the present invention, any one of the workpiece and the moving means may preferably be provided.

According to the above arrangement, since the moving means is provided thereon, the inclination of the moving means can be adjusted. Accordingly, the inclination of the workpiece can be easily adjusted even when the size of the workpiece is large or when the workpiece is too heavy to put on the stage.

BRIEF DESCRIPTION OF THE DRAWINGS

FIG. 1 is a perspective view showing a surface texture measuring machine according to first embodiment of the present invention;

FIG. 11 is an illustration showing center locus obtained by measurement data scanned by a displacement detecting means of the aforesaid embodiment;

FIG. 12 is an illustration showing a relationship between the center locus and base line of the aforesaid embodiment;

FIG. 13 is an illustration showing a measurement process of inclination of measurement surface of the workpiece in the aforesaid embodiment;

DETAILED DESCRIPTION OF PREFERRED EMBODIMENT(S)

Figure 2:
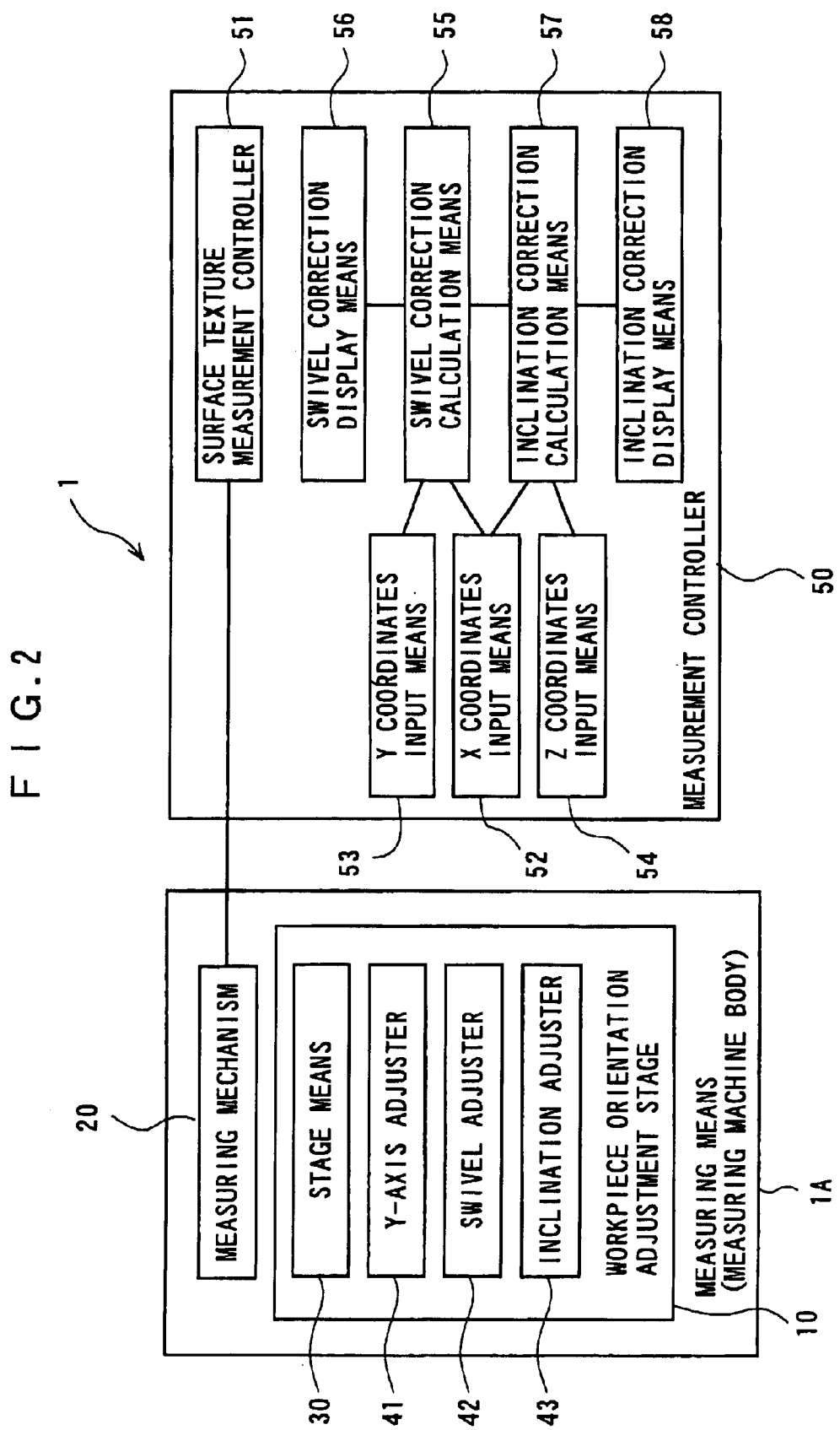
FIG. 2 is a block diagram showing the surface texture measuring machine according to the aforesaid embodiment.

Preferred embodiments of the present invention will be described below with reference to drawings.

First Embodiment

As shown in FIG. 1, a measuring machine body 1A as a measuring means of a surface texture measuring machine 1 according to first embodiment of the present invention has a base 11.

A workpiece orientation adjustment stage 10 is provided on the base 11, the workpiece orientation adjustment stage 10 having a Y-axis stage 12 capable of moving in Y-axis direction (a direction orthogonal with X-axis direction [measurement direction] on a horizontal plane), a R-axis stage 13 provided on the Y-axis stage 12 and being capable of seesawing in R-axis direction (a direction orthogonal with the X-axis direction on a perpendicular plane), and a rotary stage 14 provided on the R-axis stage 13 and being rotatable in θ direction. Further, a column 15 stands on a right side of the rear of the base 11 as illustrated, the column 15 having a Z-axis slider 16 vertically movable along Z-axis direction. A measuring mechanism 20 is provided to the Z-axis slider 16 movably in X-axis direction (measurement direction).

Position of the Y-axis stage 12 is capable of being manually adjusted by moving a moving member (not shown) provided between the Y-axis stage 12 and the base 11 along a groove 19 formed on the base 11.

A Y-axis micrometer head (referred to Digimatic micrometer head hereinafter) 41 constituting the Y-axis adjustment means is provided on a side of the Y-axis stage 12 at a front side as illustrated. A knob of the Digimatic micrometer head 41 may be manually rotated and operated by an operator to move the Y-axis stage 12 in Y-axis direction. In other words, the Digimatic micrometer head 41 is a manual drive means for moving the Y-axis stage 12.

Further, a swivel Digimatic micrometer head 42 as a swivel adjustment means and an inclination Digimatic micrometer head 43 as an inclination adjustment means are provided on a front side of the R-axis stage 13.

Among the Digimatic micrometer heads, the swivel Digimatic micrometer head 42 can change the orientation of the workpiece 17 rested on the R-axis stage 13 relative to the X-axis on X-Y plane when the knob of the Digimatic micrometer head 42 is manually rotated and operated by an operator.

The inclination Digimatic micrometer head 43 can change the inclination of the workpiece 17 rested on the R-axis stage 13 relative to the X-axis on X-Z plane when the knob of the Digimatic micrometer head 43 is manually rotated and operated by an operator.

Displays 41A, 42A and 43A are respectively provided to the Y-axis, swivel and inclination Digimatic micrometer heads 41, 42 and 43 for digitally displaying correction amount, i.e. value of operation amount as shown in FIGS. 4 to 7. Accordingly, when the workpiece orientation correction amount is given, the orientation can be easily and accurately corrected by manually manipulating the knobs of respective heads 41, 42 and 43 in accordance with the digitally displayed value.

Incidentally, minimum reading of respective Digimatic micrometer head 41, 42 and 43 is, for instance, approximately 0.001 mm. Further, the Y-axis stage 12 can be moved in Y-axis direction by the Y-axis Digimatic micrometer head 41 within a range of ±12.5 mm, for instance, the stage means 30 can be rotated on the X-Y plane by the swivel Digimatic micrometer head 42 within a range of ±2°, for instance, and the stage means 30 can be inclined on X-Z plane by the inclination Digimatic micrometer head 43 within a range of ±1.5°, for instance. Accordingly, highly accurate correction of the orientation is possible.

The workpiece 17 is directly rested on the rotary stage 14, or alternatively, the workpiece 17 is rested on the rotary stage 14 through a jig such as V-block 18 as illustrated.

The rotary stage 14 and the jig such as V-block 18 used as necessary constitute the stage means 30 and the workpiece orientation adjustment stage 10 is constructed including the stage means 30, the Y-axis stage 12 and the R-axis stage 13.

Incidentally, the V-block 18 may alternatively be a stationary jig.

The measuring mechanism 20 has a X-axis drive device movable in X-axis direction relative to the Z-axis slider 16, a measurement arm 22 attached to the X-axis drive device 21 movably in X-axis direction, and a contact-type sensor 24 attached to an end of the measurement arm 22 and having a stylus (contact piece) 23 at a distal end thereof.

The measuring mechanism 20 displaces the stylus 23 in accordance with irregularity of the surface profile of the workpiece 17 by moving the measurement arm 22 in X-axis direction while keeping the stylus 23 in contact with the workpiece 17 held on the rotary stage 14, so that the oscillation of the stylus 23 at the moment is detected, thus measuring profile configuration, surface roughness etc. of the workpiece 17 based on the oscillation.

As shown in FIG. 2, the surface texture measuring machine 1 has the measuring machine body 1A and a measurement controller 50 for controlling the measuring machine body 1A for adjusting orientation of the workpiece 17.

The measurement controller 50 has, in addition to ordinary surface texture measurement controller 51, a X-coordinates input means 52 for inputting X-coordinates obtained in measuring the workpiece 17 for adjusting orientation, a Y-coordinates input means 53 for inputting Y-coordinates value, a Z-coordinates input means 54 for inputting Z-coordinates value, a swivel correction calculation means 55 for calculating a swivel inclination and correction amount thereof from the X-coordinates and Y-coordinates, a swivel correction display means 56 for displaying and printing the calculated swivel correction, an inclination correction calculation means 57 for calculating inclination and correction thereof from the X-coordinates and Z-coordinates, and an inclination correction display for displaying and printing the correction amount, the measurement controller being constituted by, for instance, a microcomputer or data processor and various program installed therein.

Next, an adjustment process for adjusting the orientation of the workpiece as a preliminary step for measuring roughness of ridge of the cylindrical workpiece 17 using the workpiece orientation adjustment stage 10 will be described below with reference to block diagrams of FIGS. 4 to 7 and flowchart of FIG. 8.

Figure 8:
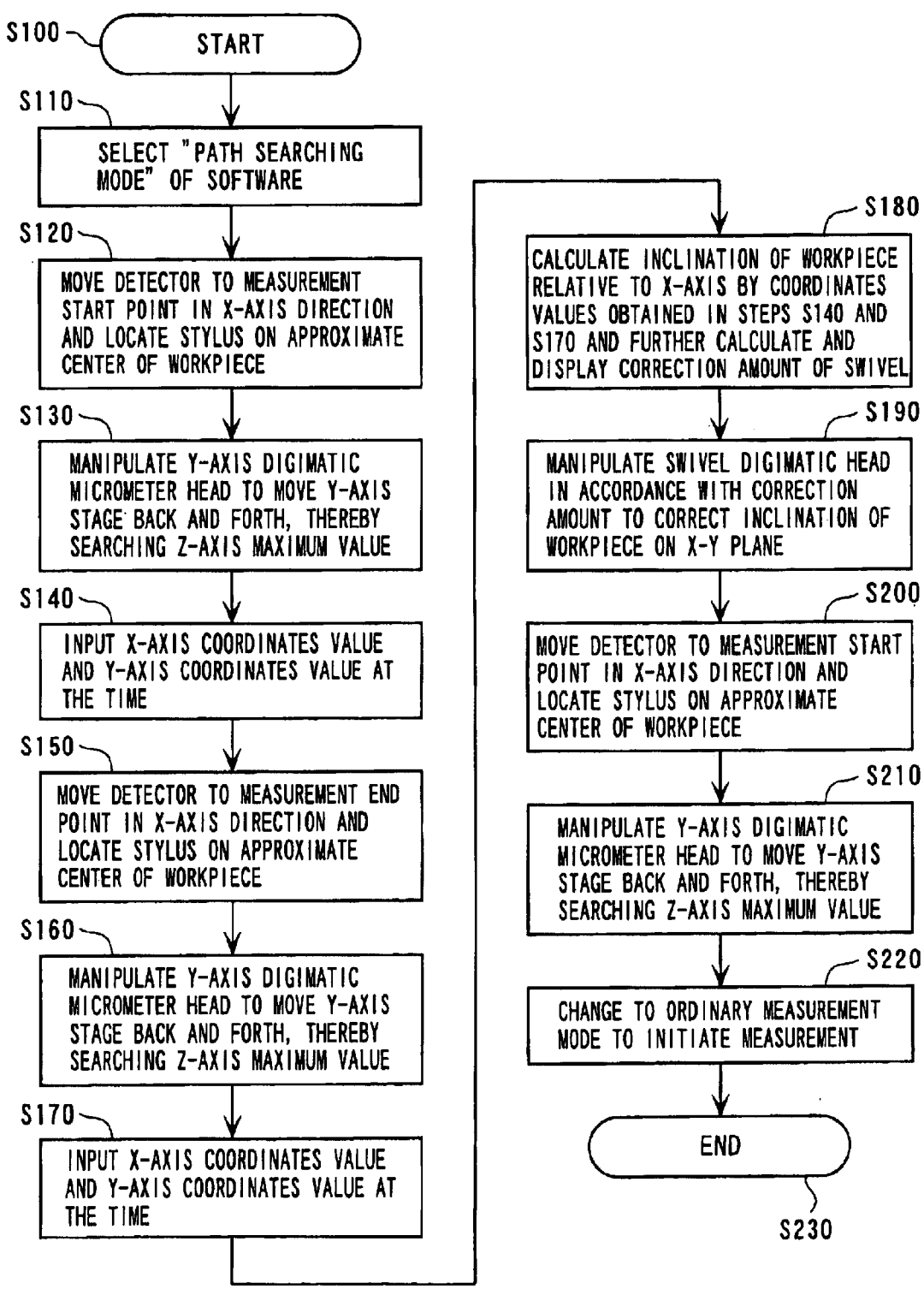
FIG. 8 is a flowchart showing a process for adjusting orientation according to the surface texture measuring machine of the aforesaid embodiment.

As shown in FIG. 8, when the adjustment of the orientation of the workpiece is started in step 100, "path searching mode" is selected by the software installed in the controller of the surface texture measuring machine 1 in step 110.

Figure 4:
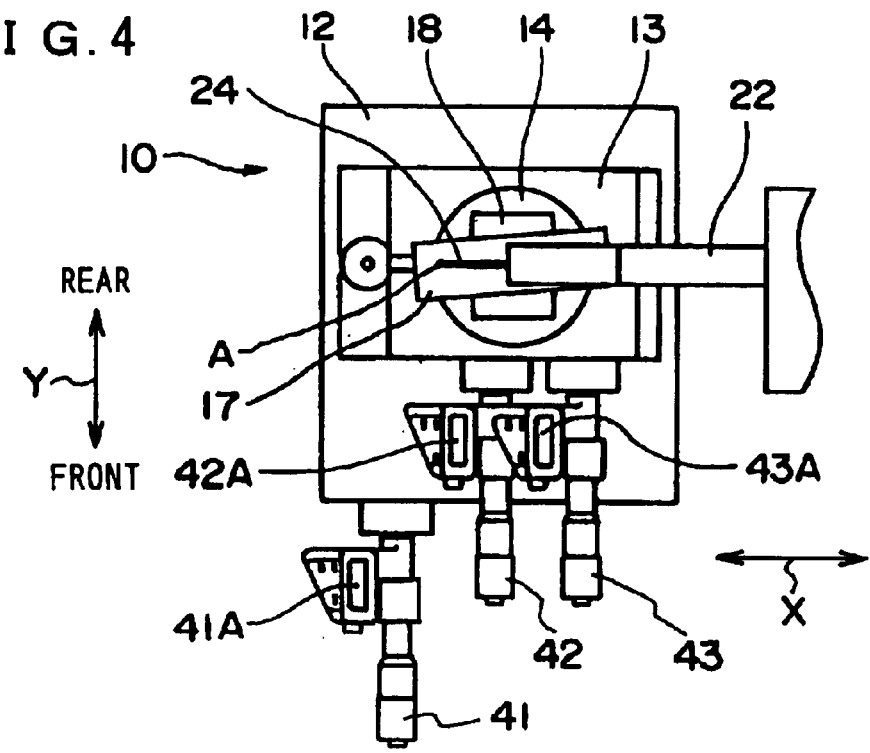
FIG. 4 is an illustration showing a process for adjusting orientation according to the surface texture measuring machine of the aforesaid embodiment.

In step 120, as shown in FIG. 4, the operator manually moves the sensor 24 in X-axis direction toward measurement start point A to locate the stylus 23 at an approximate center (in Y-axis direction) of the workpiece 17.

In step 130, the operator rotates the knob of the Y-axis Digimatic micrometer head 41 to move the Y-axis stage 12 back and forth, thus detecting a position of the workpiece 17 where Z-coordinates displayed on CRT etc. becomes maximum.

In step 140, the X-coordinates and Y-coordinates of the position where the Z-coordinates become maximum are entered by key to the measurement controller 50. At this time, a value shown on the display 41A of the Y-axis Digimatic micrometer head 41 is entered as the Y-coordinates. The X-coordinates is automatically entered to the measurement controller 50.

Figure 5:
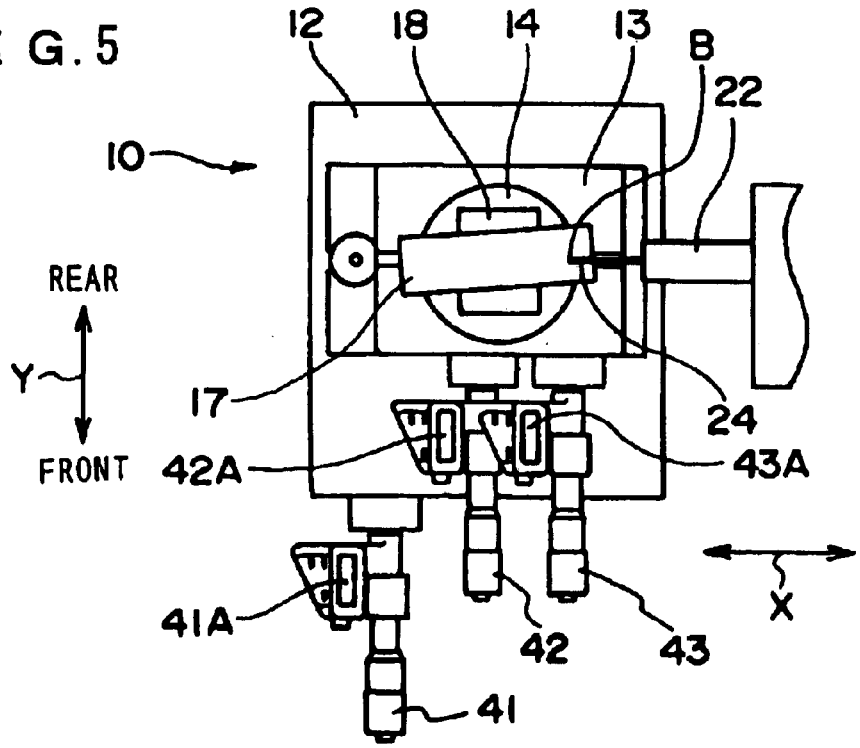
FIG. 5 is an illustration showing a process for adjusting orientation according to the surface texture measuring machine of the aforesaid embodiment.

In step 150, as shown in FIG. 5, the operator manually or automatically moves the sensor 24 in X-axis direction toward measurement end point B to locate the stylus 23 at approximate center (in Y-axis direction) of the workpiece 17.

In step 160, the operator manually rotates the knob of the Y-axis Digimatic micrometer head 41 to move the Y-axis stage 12 back and forth, thus detecting a position of the workpiece 17 where the Z-coordinates of the workpiece 17 displayed on CRT etc. becomes maximum.

In step 170, the X-coordinates and Y-coordinates of the position where the Z-coordinates become maximum is entered into the measurement controller 50 by key. At this time, a value shown on the display 41A of the Y-axis Digimatic micrometer head 41 is entered as the Y-coordinates. The X-coordinates is automatically entered to the measurement controller 50.

In step 180, swivel inclination angle δ is calculated based on the coordinates values (Xs, Ys) and (Xe, Ye) obtained in steps 140 and 170 according to a formula of: $\tan \delta = (Ye - Ys)/(Xe - Xs)$, and swivel correction angle ds is further obtained.

The swivel correction angle ds is obtained as follows.

Figure 3:
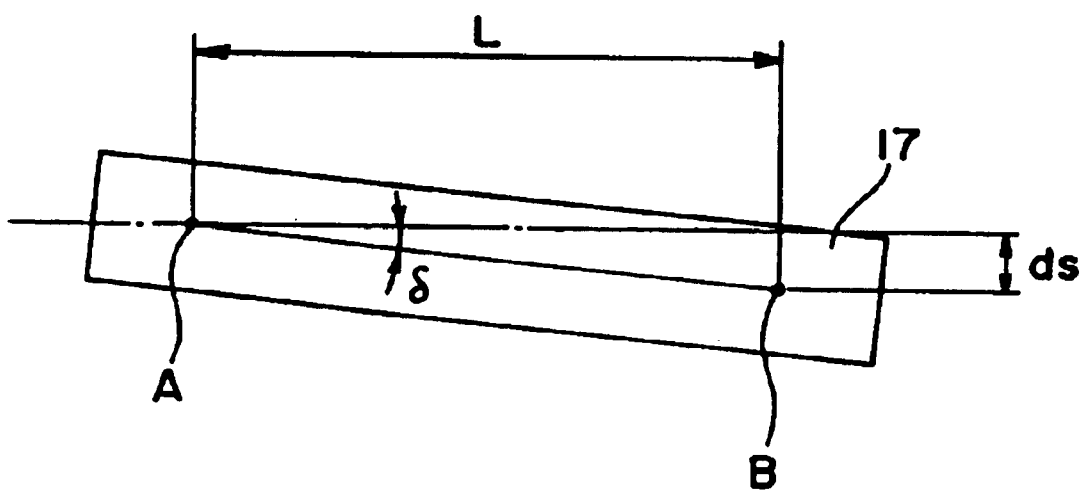
FIG. 3 is an illustration showing a principle for adjusting orientation according to the surface texture measuring machine of the aforesaid embodiment.

As shown in FIG. 3, when the distance between the rotation fulcrum A of the swivel and manipulation point B (a position where the swivel is pushed and pulled) of the swivel Digimatic micrometer head 42 is L and inclination angle of the swivel is δ, since $\tan \delta = (ds/L)$, the operation amount ds of the swivel Digimatic micrometer head can be represented as: $ds = L \tan \delta$.

Thus obtained swivel operation amount ds is displayed on CRT etc. or LCD display, or is outputted to a printer.

Figure 6:
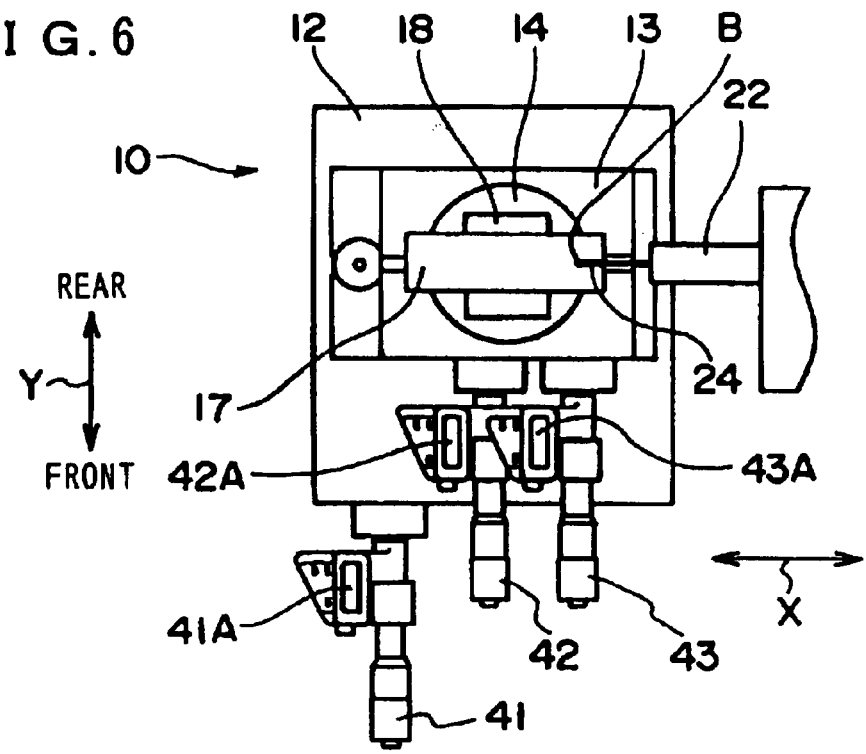
FIG. 6 is an illustration showing a process for adjusting orientation according to the surface texture measuring machine of the aforesaid embodiment.
Figure 7:
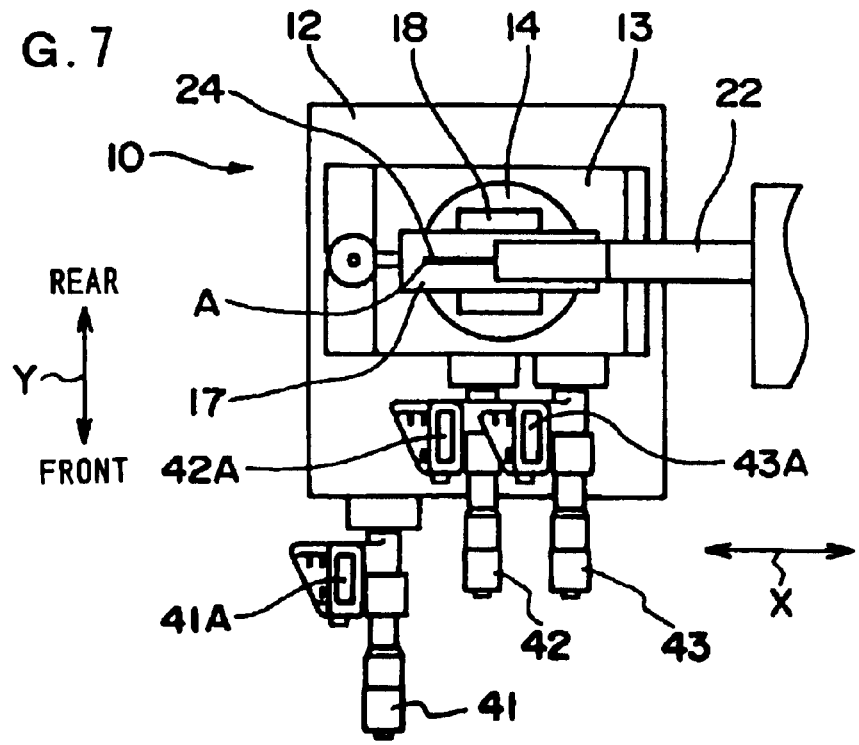
FIG. 7 is an illustration showing a process for adjusting orientation according to the surface texture measuring machine of the aforesaid embodiment.

In step 190, as shown in FIG. 6, the operator rotates the knob of the swivel Digimatic micrometer head 42 to correct inclination of the workpiece 17 on the X-Y plane in accordance with obtained swivel operation amount ds.

In step 200, the operator again manually or automatically moves the sensor 24 in X-axis direction to the measurement start point A and locates the stylus 23 at an approximate center of the workpiece (Y-axis direction).

In step 210, the operator manually rotates the knob of the Y-axis Digimatic micrometer head 41 to move the Y-axis stage back and forth, thus detecting a position where the Z-coordinates of the workpiece 17 displayed on CRT etc. becomes maximum.

In step 220, the controller is switched to ordinary measurement mode to start measuring surface roughness etc., and;

In step 230, terminates adjustment of workpiece orientation.

In the above, the workpiece is assumed to be a cylinder. When a workpiece having convex surface etc., an inner surface of the cylinder is measured, minimum value may be measured instead of maximum value in the above steps 130, 160 and 210. Further, when the surface of the workpiece does not have simple curve, maximal value or minimal value may be obtained instead of maximum value and minimum value for serving the same purpose.

Further, though the swivel adjustment is conducted only on the X-Y plane, the correction amount of the inclination Digimatic micrometer head 43 may be similarly obtained by the inclination of the workpiece relative to X-axis on X-Z plane. In this case, Z-coordinates is simultaneously obtained and entered in steps 140 and 170. And in step 180, the inclination amount and inclination correction amount may be obtained according to the same principle as in step 180 for obtaining inclination amount and correction angle of the swivel to be displayed or printed. Thereafter, in step 190, the inclination Digimatic micrometer head is manipulated to correct the inclination of the workpiece on the X-Z plane.

Finally, a command is sent to the measuring mechanism 20 by the. surface texture measurement controller 51 having received a correction completion signal and the surface texture measurement controller 51 moves (for scanning) the sensor 24 in X-axis direction, thus actually measuring the workpiece 17 at a reference orientation.

At this time, in conducting the actual measurement, vertical movement of the measuring mechanism 20 in Z-axis direction and initial position of the stylus 23 of the measuring mechanism 20 may be automatically controlled by the surface texture measurement controller 51 in the same manner as orientation adjustment, or alternatively may be conducted by an operator. However, since the orientation of the workpiece 17 is accurately recognized during orientation adjustment, it is preferable that the surface texture measurement controller 51 automatically controls the vertical movement and the initial position in viewpoint of automation. Further, the timing for starting actual measurement may be commanded by the operator having confirmed completion of correction instead of correction completion signal by the controller.

According to the present embodiment, following effects can be obtained.

1) In adjusting the orientation of the workpiece, the orientation of the workpiece 17 can be adjusted only by rotating the knobs of the Y-axis, swivel, and inclination Digimatic micrometer heads 41, 42 and 43 in accordance with the correction angle calculated by the measurement start point A and measurement end point B of the workpiece 17 held on the V-block 18 on the workpiece orientation adjustment stage 10. Since the respective Digimatic micrometer heads 41–43 have the displays 41A–43A, the operator can rotate the knobs until the digitally displayed numeral is reached, thus facilitating operation thereof and immediately and highly accurately adjusting the orientation of the workpiece.

2) Since the orientation of the workpiece 17 can be adjusted by rotating the knobs of the respective Digimatic micrometer heads 41, 42 and 43 in accordance with the correction angle calculated by the measurement start point A and the measurement end point B as described above, the drive motor of the workpiece orientation adjustment stage 10 is not required in adjusting the orientation. Accordingly, the space for providing the motor is not required, thus reducing the size of the device.

3) Since the motor is not required, the stage does not require rigidity for preventing the vibration etc. by the motor, the structure can be simplified and the size thereof can be reduced, thus reducing the cost of the device.

4) Since the workpiece orientation adjustment stage 10 has the Y-axis Digimatic micrometer head 41 for linearly moving the stage means 30, the swivel Digimatic micrometer head 42 for rotating the stage means 30, and the inclination Digimatic micrometer head 43 for tilting and seesawing the stage means 30, the orientation of the workpiece 17 can be securely corrected to the reference orientation before conducting actual measurement irrespective of the initial orientation of the workpiece 17.

Second Embodiment

Next, second embodiment of the present invention will be described below with reference to FIGS. 9–13.

The present embodiment is directed to an leveling device 60 provided to the surface texture measuring machine 1 of the above-described first embodiment for measuring the inclination of the workpiece 17 by the measuring mechanism 20 and accurately adjusting the orientation of the workpiece based on the measurement data. In other words, the leveling device 60 according to the present embodiment corresponds to the stage means 30 having the R-axis stage 13 and the inclination Digimatic micrometer head 43, and can be held on the base 11 in place of the stage means 30.

Figure 9:
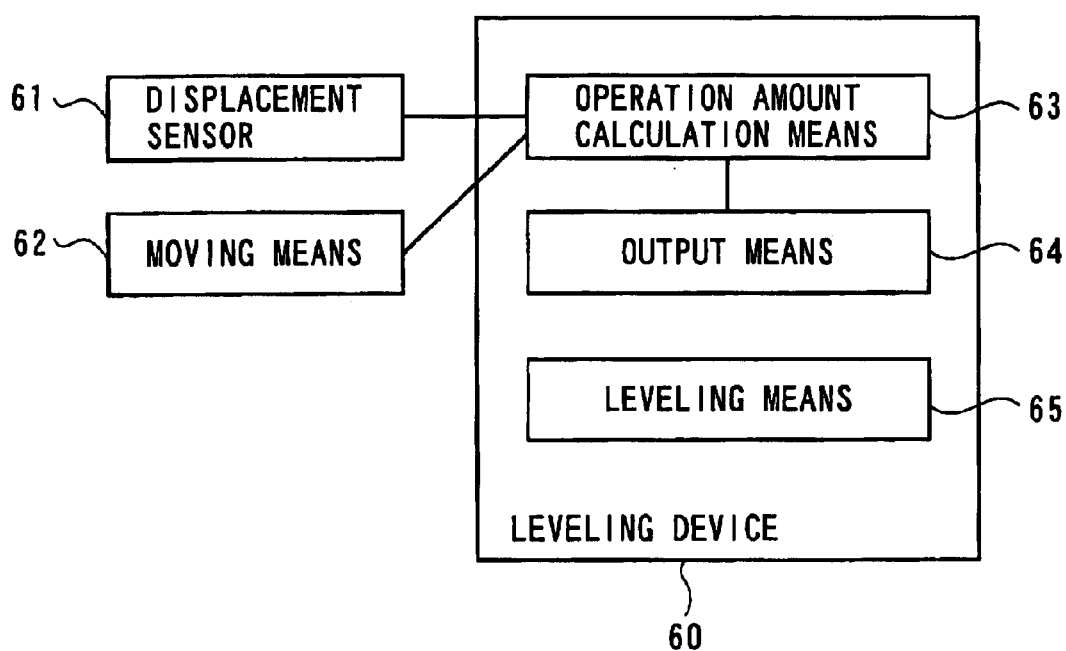
FIG. 9 is a block diagram showing an leveling device according to second embodiment of the present invention.

As shown in FIG. 9, the leveling device 60 has a operation amount calculation means 63 for calculating a operation amount for inclination adjustment based on information from a displacement detecting means 61 and moving means 62, an output means 64 for displaying, or printing, or data-outputting the calculated operation amount, and an inclination adjustment means 65 for giving minute displacement relative to point of action to adjust inclination.

The displacement detecting means 61 is composed of a contact-type or non-contact type displacement sensor and outputs a height (displacement) sensor of the surface of the workpiece, which corresponds to the sensor 24 of the measuring mechanism 20 of the above-described first embodiment. As a result, the displacement detecting means 61 traces the surface of the workpiece to output a series of measurement data.

The operation amount calculation means 63 retrieves center locus of the measurement data, calculates the inclination amount between the center locus and a base line of the moving means 62, and further calculates a operation amount required for paralleling the center locus and the base line to set the inclination amount as zero.

Figure 10:
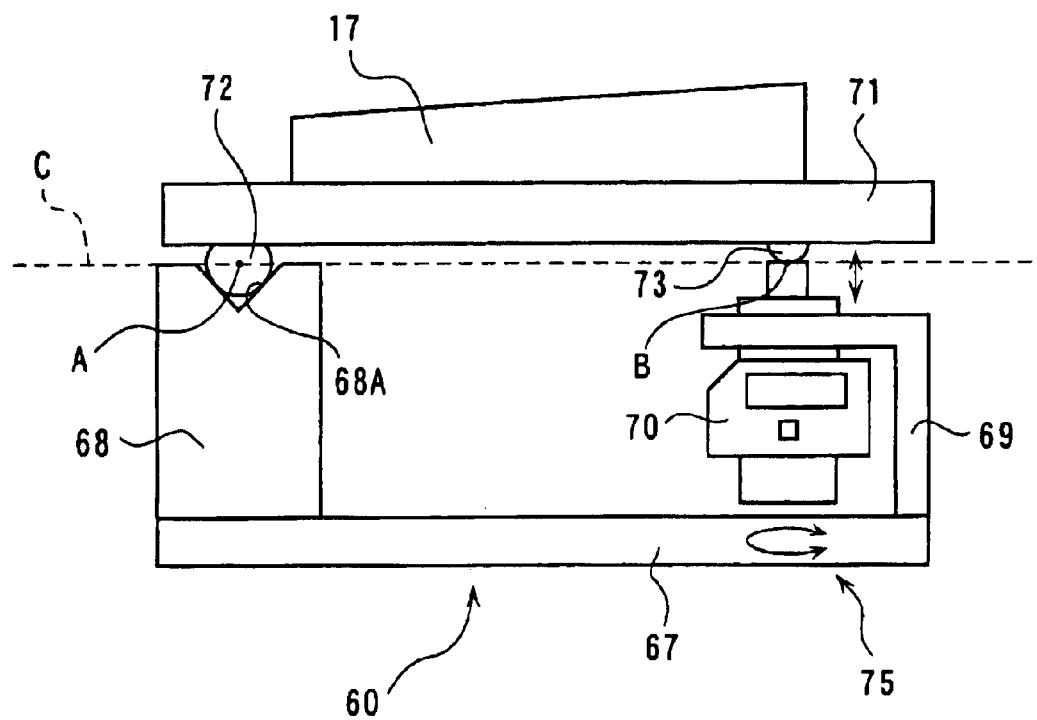
FIG. 10 is a front elevation showing the leveling device according to the aforesaid embodiment.

As shown in FIG. 10, the leveling device 60 has a base 67, a stand 68 and a holder 69 provided on upper side of the base 67 spaced apart with each other by a predetermined distance, a micrometer head 70 attached to the holder 69 and constituting an inclination adjustment means 75 together with the holder 69, and a stage 71 provided above the stand 68 and the holder 69 for the workpiece 17 to be rested thereon.

A substantially semispherical fulcrum member 72 for rotatably supporting the stage 71 is secured to a position at a lower side of the stage 71 corresponding to the stand 68. And a substantially semispherical point-of-action member 73 is secured to a position on the holder 69 corresponding to the micrometer head 70.

A support portion 68A having V-shaped or conic cross section is formed on an upper side of the stand 68 for receiving the spherical portion of the fulcrum member 72. Though the support portion 68A is formed to have a depth where the horizontal center line of the spherical portion of the fulcrum member 72 is equal to the height of the upper side of the stand 68, the center line position may not be equal to the height of the upper side. When the fulcrum member 72 is supported by the support portion 68A, the central position of the sphere of the fulcrum member 72 becomes the fulcrum A.

The size of the semispherical portion of point-of-action member 73 is smaller than that of the fulcrum member 72. When the distal end of the point-of-action member 73 is in contact with the flat distal end of the micrometer head 70, the distal end of the point-of-action member 73 becomes a point of action B. The line connecting the distal end of the point-of-action member 73 and the fulcrum A is an inclination line C of the leveling device 60.

Incidentally, the configuration of the point-of-action member 73 is preferably to be shaped so that perpendicular projection amount of the point-of-action member 73 is always constant irrespective of rotation angle of the stage 71 in viewpoint of preventing error.

A center locus M is initially obtained in measuring the surface of the workpiece 17 by the leveling device 60.

In FIG. 11, an example is shown where the center locus M is obtained from the measurement data scanned by the displacement sensor of the displacement detecting means. In the figure, X-axis shows a tracing direction by the displacement sensor (parallel to the base line N of the moving means 62). In this example, the central locus is obtained by least square method.

When the surface of the workpiece 17 is inclined and the center locus M and the base line N of the moving means 62 is not parallel, the center locus M rises rightward as shown in FIG. 11, or alternatively, declines rightward (not shown).

On the other hand, the displacement sensor of the displacement detecting means 61 has a certain limitation in a relationship between the resolution and measurement range. Specifically, when the resolution is raised, the measurement range can be narrowed. In order to widen the measurement range, the resolution has to be lowered. When the center locus M is tilted as described above, the measurement range has to be widened, so that measurement having wide resolution cannot be conducted.

In the present invention, the center locus M and the base line N are brought parallel by the leveling device 60, so that the measurement can be conducted with the greatest available resolution for the workpiece 17.

Since the inclination adjustment means 75 shown in FIG. 10 applies linear minute vertical displacement against the point of action B to turn the stage 71 relative to the fulcrum A, accurate inclination adjustment angle (operation amount)

cannot be obtained according to initial inclination angle of the stage 71 in measuring the inclination.

Specifically, as shown in FIG. 12, when the initial inclination angle of the stage 71, i.e. the inclination line C is parallel to the base line N and the angle of the center locus M relative to the base line N is θ1, accurate operation amount Δh can be obtained according to formula of Δh=r*sin θ1. Here, r represents a distance from the fulcrum A of the stage 71 to the point of action B.

On the other hand, when the inclination line C of the stage 71 is not parallel to the base line N but is rising in the right direction relative to the base line N, turn angle thereof can be represented as θ2 as shown in FIG. 12. When the stage is manipulated for Δh from a position remote from the base line N, the stage is manipulated at a steeper position for an angle away from the base line N as compared to manipulation for Δh from a horizontal position, so that θ2 becomes smaller than θ1 (θ1>θ2).

Accordingly, when the initial inclination angle of the stage 71 is not parallel to the base line N, the relationship between the operation amount and the turn angle cannot be uniformly decided, thus causing inclination adjustment error.

Thus, in the present embodiment, a position of the point of action B where the inclination line C connecting the fulcrum A and the point of action B of the stage 71 of the leveling device 60 is parallel with the base line N of the moving means 62 is set as the inclination adjustment reference position P and the operation amount is defined as an absolute quantity from the inclination adjustment reference position P, so that such error can be avoided.

In other words, since the operation amount is not given as a relative quantity but is constantly given as an absolute quantity from the inclination adjustment reference position P, the inclination adjustment error can be avoided.

The inclination adjustment reference position P can be obtained as follows. Initially, thickness of the stage 71, projection of the point-of-action member 73 and projection of fulcrum A at the center of the spherical fulcrum member 72 (i.e. offset amount from a lower surface of the stage 71) are measured in advance. Subsequently, inclination of upper surface of the stage 71 is measured. From the measurement results, the position where the point of action B corresponds to the inclination adjustment reference position P. By arranging the thickness of the stage 71 to be uniform and by equaling the projection of the point-of-action member 73 and the offset amount of the fulcrum A from the lower surface of the stage 71, the point of action B corresponds to the inclination adjustment reference position P when the inclination of the upper surface of the stage 71 is parallel with the base line N. Thus, the inclination adjustment reference position can be obtained.

FIG. 13(A) shows a measurement of inclination of a measurement surface of the workpiece, where the initial inclination of the inclination line C declines rightward by an absolute quantity ht relative to the inclination adjustment reference position P. Since the inclination angle of the inclination line C relative to the base line N including the inclination adjustment reference position P is θt and the inclination angle of the measurement surface of the workpiece relative to the base line N including the inclination adjustment reference position P is θw, it is necessary to turn the stage 71 by θw relatively. However, as mentioned above, since the error can be caused, the relative minute displacement at the point of action B for turning only by θw relative to the base line N cannot be uniformly decided.

In this case, as shown in FIG. 13(B), the inclination of the measurement surface of the workpiece (center locus) can be coincided with the base line without error by setting the manipulated valuable hc equal to an absolute value from P where the turning angle is θc (=θt+θw).

The turning angle of the stage 71 is adjusted by the micrometer head 70 of the inclination adjustment means 75, where a minute displacement (operation amount) at the point of action B defines the turning angle. Accordingly, in order to adjust the surface inclination of the workpiece 17 on the stage 71, inclination amount between the center locus M of the measurement data and the base line N of the moving means 62 is measured to obtain a operation amount required to parallel those M and N, and a minute displacement corresponding to the operation amount is given by the inclination adjustment means 75, so that the inclination on the surface of the workpiece 17 can be made parallel relative to the base line N of the moving means 62. As a result, the displacement sensor of the displacement detecting means 61 can scan the surface of the workpiece 17 with the maximum resolution.

According to the second embodiment, following effects can be obtained.

5) When the surface of the workpiece 17 is measured and found to be inclined, the micrometer head 70 can be rotated until the center locus M of the measurement data S is parallel to the base line N of the moving means 62. At this time, since the inclination adjustment is given as an absolute quantity, so-called "cosine error" can be prevented to eliminate inclination adjustment error, and the inclination can be adjusted with one operation, thus facilitating adjustment process of the orientation of the workpiece without impairing operability.

6) Since the inclination of the workpiece 17 can be manually adjusted by, for instance, rotating the micrometer head 70, without using motor, the size and cost of the device can be reduced.

7) Since the inclination of the workpiece 17 can be adjusted by operating the micrometer head 70 of the inclination adjustment means 75, the inclination can be adjusted with high accuracy.

Third Embodiment

Figure 14:
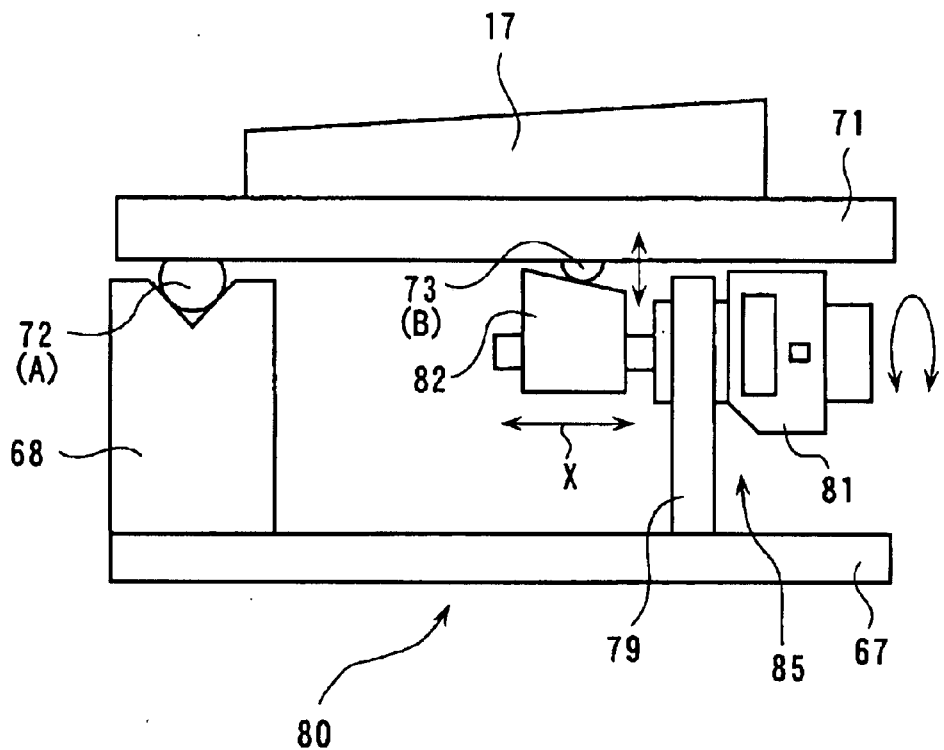
FIG. 14 is a front elevation showing an leveling device according to third embodiment of the present invention.

Next, third embodiment of the present invention will be described below with reference to FIG. 14.

In the present embodiment and below-described fourth and fifth embodiments, the same reference numeral will be applied to the same component as in the above-described second embodiment to omit or simplify detailed explanation thereof.

An leveling device 80 of the present embodiment has an inclination adjustment means 85 composed of an absolute micrometer head 81 having an inclination piece 82 at a distal end thereof, the micrometer head 81 being attached to a holder 79.

Specifically, the inclination piece 82 is connected to the distal end of the absolute micrometer head movably in arrowed X direction and has a inclined surface on a side in contact with the point-of-action member 73 declined toward the micrometer head 81. Accordingly, when the knob of the micrometer head 81 is manually rotated, the inclination piece 82 is moved back and forth, so that the point-of-action member 73 is vertically moved by virtue of the inclined surface of the inclination piece 82, thus adjusting the amount of the surface of the stage 71 and, in consequence, the workpiece 17.

According to the above-described third embodiment, following effect as well as the above-mentioned effects 5) to 7) can be obtained. 8) Since the absolute micrometer head 81 is specifically used as the inclination adjustment means, the operation from the reference position P can be facilitated, so that inclination can be adjusted with high accuracy at a small number of inclination adjustment operation.

Fourth Embodiment

Next, the fourth embodiment of the present invention will be described below with reference to FIG. 15.

An leveling device 90 according to the present embodiment can adjust inclination thereof three-dimensionally.

Figure 15:
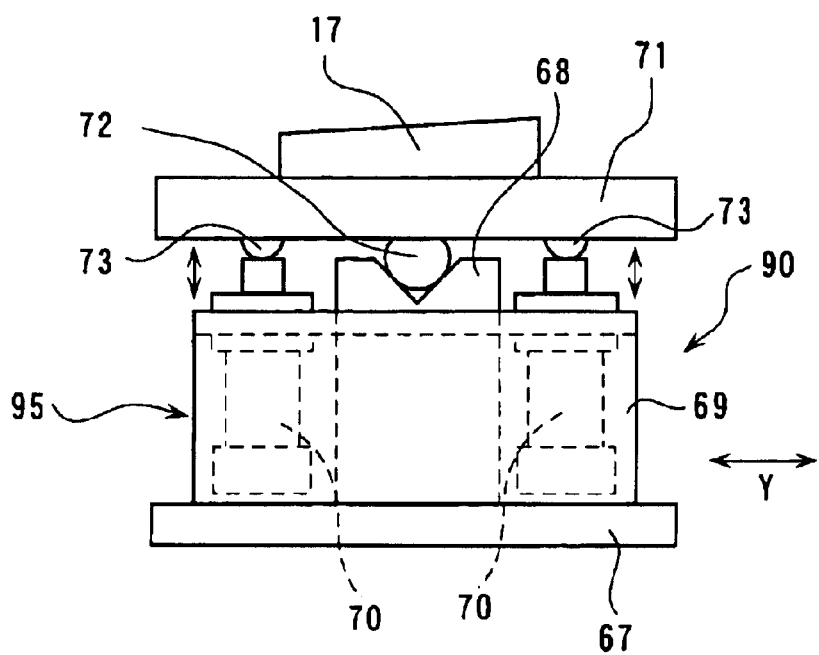
FIG. 15 is a side elevation showing an leveling device according to fourth embodiment of the present invention.

Specifically, as shown in front elevation of FIG. 15, the leveling device 90 has two micrometer heads 70 attached to the holder 69 to constitute the inclination adjustment means 95, whereas only a single micrometer head 70 is used in the second embodiment. Accordingly, the stage 71 is supported by three points, i.e. the fulcrum member 72 and two point-of-action members 73.

The two micrometer heads 70 can be independently adjusted. Accordingly, the inclination can be adjusted not only in X-axis direction but also in Y-axis (an axis orthogonal with both the X-axis and Z-axis) direction, thus scanning the surface of the workpiece 17 three-dimensionally.

According to the fourth embodiment, following effect as well as the effects 5) to 7) can be obtained.

8) Since the inclination adjustment means 90 can be independently operated at two points, the inclination can be adjusted not only in X-axis direction but also in Y-axis (an axis orthogonal with X-axis direction on a horizontal plane) direction. Accordingly, the surface of the workpiece can be scanned three-dimensionally, thus enlarging measurement range.

Fifth Embodiment

Figure 16:
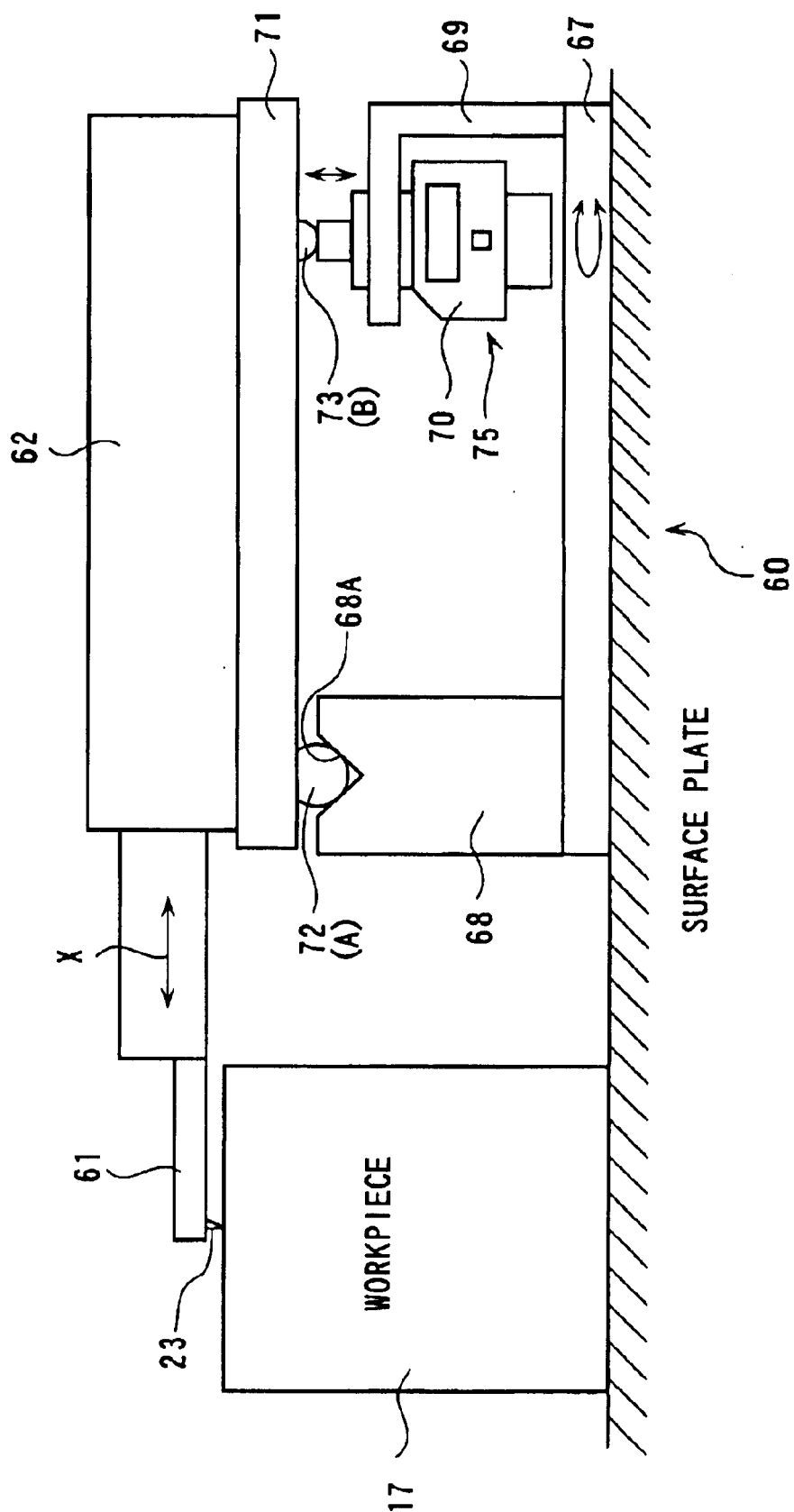
FIG. 16 is a front elevation showing an leveling device according to fifth embodiment of the present invention.

Next, the fifth embodiment of the present invention will be described below with reference to FIG. 16.

In the present embodiment, the inclination of the moving means 62 is adjusted whereas the leveling devices 60, 80 and 90 in the second to the fourth embodiments adjust the inclination of the stage 71 with the workpiece 17 held thereon to adjust the inclination of the surface of the workpiece 17.

Specifically, the present embodiment uses the leveling device 60 of the second embodiment, and a moving means 62 is provided on the stage 71. The inclination of the moving means 62 is adjusted by the fulcrum member 72 and the point-of-action member 73 being driven by the micrometer head 70. The displacement detection means 61 is movable in the arrowed X direction by the moving means 62.

The present embodiment can be preferably used when a dimension of the workpiece 17 is large or the workpiece is too heavy to mount on the stage 71. In the present embodiment, the workpiece 17 is disposed adjacent to the leveling device 60.

According to the fifth embodiment, following effect can be obtained as well as effects 5) to 7).

10) Since the moving means 62 is mounted on the stage 71 of the leveling device 60, the inclination of the moving means 62 can be adjusted. Accordingly, the inclination of the workpiece 17 can be easily adjusted even when the dimension of the workpiece 17 is large or when the workpiece 17 is too heavy to mount on the stage 71.

Modifications

Incidentally, the scope of the present invention is not restricted to the above-described respective embodiments but includes other arrangement as long as an object to the present invention can be attained, including below-described modifications. For example, the present invention can work with the workpieces of the related art (Fukuda) as shown in FIGS. 17 and 18.

Though the sensor 24 in the first embodiment is a contact-type sensor having the stylus 24 to be in contact with the workpiece 17 to scan configuration thereof, the sensor used in actual measurement or preliminary measurement is not restricted to such an arrangement but may be, for instance, an optical non-contact type sensor.

Further, though the workpiece 17 in the first embodiment has a cylindrical shape, the shape of the workpiece is not restricted and any workpiece having any edge line can be measured.

Figure 17:
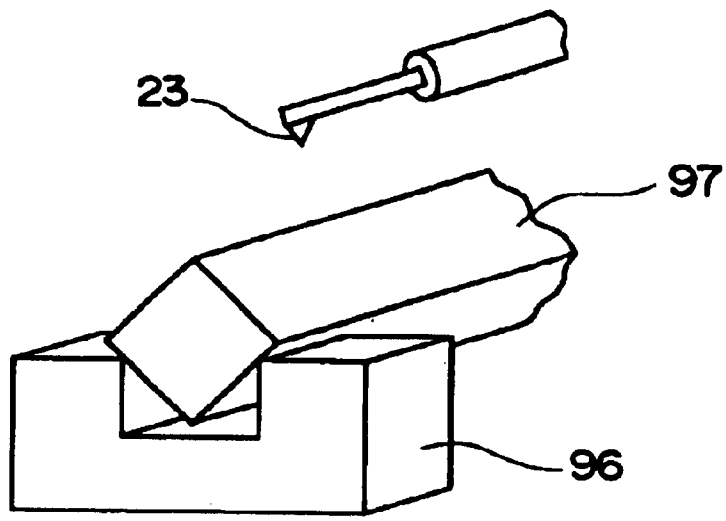
FIG. 17 is an illustration showing a modification of the present invention.
Figure 18:
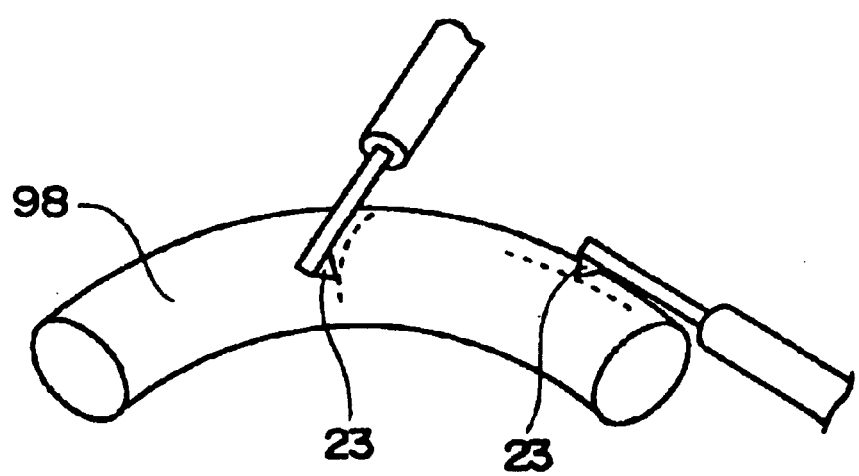
FIG. 18 is an illustration showing another modification of the present invention.

For instance, as shown in FIG. 17, a square-pillar workpiece 97 may be measured by being put on the stage means 96 while showing edge line thereof.

Further, the ridge line of the workpiece may not be a straight line as in the embodiments, but may be curved. For instance, as shown in FIG. 18, texture of a bent cylindrical workpiece 98 can be measured. In this case, the orientation of the workpiece 98 can be more accurately corrected into a desired orientation (reference orientation) by increasing the number of a measurement point of the sensor 24.

Further, though the sensor 24 of the measuring mechanism 20 is moved in X-axis direction relative to the base 11 by the X-axis drive device 21, the workpiece 17 (stage means 30) may be moved in X-axis direction relative to the base 11. In other words, the workpiece can be scanned during measurement (measurement in actual measurement or measurement in adjusting orientation) as long as the sensor 24 and the workpiece 17 can be relatively moved in X-axis direction (measurement direction).

Though the micrometer head 70 is used as the inclination adjustment means in the second, fourth and fifth embodiments, the absolute micrometer head 81 may be used instead of the micrometer head 70 as in the third embodiment. Alternatively, the micrometer head 70 can be used instead of the absolute micrometer head 81 in the third embodiment.

Further, though a moving means 62 is provided on the stage 71 in the fifth embodiment, the stage 71 may also be used as a reference plane member included in the moving means 62.

Further, though the leveling device 60 of the second embodiment is used as an leveling device for providing the moving means 62 in the fifth embodiment, the leveling devices 80 and 90 of the third and fourth embodiments can also be used.

What is claimed is:

1. A leveling device for a surface texture measuring machine, the surface texture measuring machine comprising: a displacement detecting means movable in a measurement direction (X-axis direction) for measuring displacement (Z-axis direction) on a surface of a workpiece; and a moving means for moving the displacement detecting means in the measurement direction to scan a displacement signal from the displacement detecting means, the surface texture measuring machine adjusting an amount of a workpiece stage relative to a base line as a movement locus of the moving means, the leveling device comprising:

a fulcrum for rotatably supporting the workpiece stage during measurement and adjustment and a point of action working relative to the fulcrum;

a manipulated variable calculation means for single scanning the surface of the workpiece by the displacement detecting means and for calculating a center locus, an inclination of the surface of the workpiece, of a series of at least three measurement data based on a single-scanned displacement signal from the displacement detecting means to calculate an operation amount at the point of action relative to the fulcrum required for paralleling the center locus with the base line of the moving means;

an output means for displaying, printing or outputting as data the operation amount; and an inclination adjustment means which an operator can manually operate to adjust the inclination of the workpiece stage relative to the X-axis on X-Z plane for manually adjusting inclination of a predetermined amount, wherein the operation amount is calculated in length the manipulated variable calculation means from an inclination reference position where an inclination line connecting the fulcrum and the point of action of the inclination adjustment means is parallel with the base line of the moving means, based on the angle of the center locus relative to the base line of the moving means.

2. The leveling device according to claim 1, wherein the inclination adjustment means includes a micrometer head.

3. The leveling device according to claim 1, wherein the operation amount includes operation amount at any two points on the inclination adjustment means conducting three-point support.

4. The leveling device according to claim 1, further comprising any one of the workpiece and the moving means.

* * * * *